US009067572B2

(12) United States Patent
Lichterfeld et al.

(10) Patent No.: US 9,067,572 B2
(45) Date of Patent: Jun. 30, 2015

(54) BRAKE ARRANGEMENT OF A RAIL VEHICLE

(75) Inventors: Jens Peter Lichterfeld, Erlangen (DE); Manfred Wiesand, Burgthann (DE)

(73) Assignee: Siemens Aktiengesellschaft, Munich (DE)

( * ) Notice: Subject to any disclaimer, the term of this patent is extended or adjusted under 35 U.S.C. 154(b) by 294 days.

(21) Appl. No.: 13/522,772

(22) PCT Filed: Jan. 6, 2011

(86) PCT No.: PCT/EP2011/050128
§ 371 (c)(1),
(2), (4) Date: Jul. 18, 2012

(87) PCT Pub. No.: WO2011/086029
PCT Pub. Date: Jul. 21, 2011

(65) Prior Publication Data
US 2012/0286563 A1 Nov. 15, 2012

(30) Foreign Application Priority Data
Jan. 18, 2010 (DE) .......................... 10 2010 005 091

(51) Int. Cl.
*B60T 8/17* (2006.01)
*B60T 13/66* (2006.01)
*B60T 17/22* (2006.01)

(52) U.S. Cl.
CPC .............. *B60T 8/1705* (2013.01); *B60T 13/665* (2013.01); *B60T 17/228* (2013.01)

(58) Field of Classification Search
CPC .... B60T 8/1705; B60T 17/228; B60T 13/665
USPC ........... 303/15, 3, 128, 9, 20, 22.6, 9.62, 9.66
See application file for complete search history.

(56) References Cited

U.S. PATENT DOCUMENTS 4,775,191 A * 10/1988 Roger et al. ................. 303/9.76
5,549,362 A * 8/1996 Broome ............................ 303/3
(Continued)

FOREIGN PATENT DOCUMENTS

DE 34 08 013 A1 9/1985
DE 198 48 990 A1 4/2000
(Continued)

*Primary Examiner* — Thomas J Williams
*Assistant Examiner* — Mariano Sy
(74) *Attorney, Agent, or Firm* — Laurence A. Greenberg; Werner H. Stemer; Ralph E. Locher

(57) ABSTRACT

A brake arrangement of a railway vehicle includes an electrical brake device having an electronic brake controller and having an electro-pneumatic regulator with a pressure sensor. An emergency brake device has a pressure reducer in series with a valve device. A shuttle valve device is also present at a pneumatic output of the electrical pneumatic braking device and a pneumatic output of the emergency brake system and is connected at the inputs thereof. The output of the valve device is connected to a control valve device connected upstream of a brake cylinder. The brake arrangement can be a direct braking arrangement and can be converted in a simple manner to an indirect braking arrangement. The valve device is an electromagnetic emergency stop valve working according to the principle of de-energizing to close, and the pressure sensor of the electro-pneumatic regulator is connected to the output of the shuttle valve device.

7 Claims, 4 Drawing Sheets

(56) References Cited

U.S. PATENT DOCUMENTS

| | | | |
|---|---|---|---|
| 5,615,929 A * | 4/1997 | Broome | 303/7 |
| 6,250,723 B1 | 6/2001 | Barberis et al. | |
| 6,609,767 B2 * | 8/2003 | Mortenson et al. | 303/15 |
| 6,669,308 B1 * | 12/2003 | Aurich et al. | 303/15 |
| 6,991,301 B2 | 1/2006 | Aurich et al. | |
| 8,038,226 B2 | 10/2011 | Knörnschild et al. | |

FOREIGN PATENT DOCUMENTS

| | | |
|---|---|---|
| DE | 198 48 994 A1 | 5/2000 |
| DE | 10 2004 024 462 A1 | 12/2005 |
| DE | 10 2006 018 554 B3 | 1/2008 |
| DE | 102006018554 B3 | 1/2008 |
| DE | 10 2007 031 235 A1 | 1/2009 |
| DE | 102007031235 A1 | 1/2009 |
| DE | 10 2008 012 700 B3 | 6/2009 |
| EP | 0 335 076 A2 | 10/1989 |
| EP | 0 958 980 A2 | 11/1999 |
| RU | 2211161 C1 | 8/2003 |
| RU | 2241617 C1 | 12/2004 |

\* cited by examiner

FIG 3

BRAKE ARRANGEMENT OF A RAIL VEHICLE

BACKGROUND OF THE INVENTION

Field of the Invention

The invention relates to a brake arrangement of a rail vehicle, comprising an electrical brake device having an electronic brake control and having an electropneumatic regulator which has a pressure sensor, comprising an emergency brake device having a pressure reducer in series with a valve device, comprising a shuttle valve device, which with its inputs is connected up to a pneumatic output of the electrical brake device and to a pneumatic output of the emergency brake device, and with its output is connected to a control valve device arranged upstream of a brake cylinder.

A brake arrangement of this type can be gleaned from the introductory part of the description of German patent specification DE 10 206 018 554 B3. In this known brake arrangement, the valve device of the emergency brake device consists of a brake valve and a release valve, as well as a control valve, which are activated by a dedicated electrical brake application circuit and brake release circuit. The pressure sensor of the electropneumatic regulator is connected up with its pressure input to the output of the electrical brake device and lies with its power output on the electronic brake control.

BRIEF SUMMARY OF THE INVENTION

The object of the invention is to propose a brake arrangement which is able to be produced comparatively simply as a direct brake arrangement and is configured such that it can be easily remodeled into an indirect brake arrangement.

For the achievement of this object, in a brake arrangement of the above-specified type, according to the invention, the valve device is an electromagnetic emergency brake valve operating according to the closed-circuit principle, and the pressure sensor of the electropneumatic regulator is connected up to the output of the shuttle valve device.

One advantage of the inventive brake device consists in the fact that the valve device of the emergency brake device is constructed with a single valve in the form of an emergency brake valve operating according to the closed-circuit principle, which thus requires only one activation. A further advantage is seen in the fact that, by the pressure sensor connected up to the output of the shuttle valve device, the pilot pressure at the control valve device is registered and hence an appropriate current for controlling the electronic brake control of the inventive brake arrangement can be used.

In the case of an emergency braking, this allows the emergency braking pressure to be increased to above the pressure present at the output of the emergency brake device by correspondingly higher pressurization of the shuttle valve device via the electropneumatic regulator, so that the emergency brake pressure is increased.

In the inventive brake device, the shuttle valve device can be differently configured, for instance it can consist of a single shuttle valve, as can be seen, per se, from the above-stated patent specification. The inventive brake arrangement in this case constitutes a direct brake arrangement.

Based on the above, an indirect brake arrangement, where necessary, can advantageously be obtained if the shuttle valve device contains a first and a second shuttle valve and the inputs of the first shuttle valve form the inputs of the shuttle valve device and the output of the first shuttle valve is connected to an input of the second shuttle valve; the second input of the second shuttle valve is connected up to an output of a control valve connected to the main air line of the brake arrangement and the output of the second shuttle valve forms the output of the shuttle valve device. Within the scope of the invention, only a control valve which is normally provided for use in indirect brake arrangements, and a further shuttle valve for the shuttle valve device, are required in order to obtain an indirect brake arrangement.

According to the invention, there is thus to some extent created a type of modular system, in which, in a basic version having a single shuttle valve, a direct brake arrangement is producible and, through the addition of a second shuttle valve and a control valve, an indirect brake arrangement is creatable. This is of advantage in production engineering terms.

In the inventive brake arrangement, the shuttle valves can be differently configured; it is regarded as particularly advantageous if the shuttle valves are double check valves, because these are widely used and thus inexpensive.

The inventive brake arrangement can also be differently designed with respect to the control valve device. In an advantageous embodiment, the control valve device is a relay valve, with which the small volumetric flow supplied to this relay is converted into a large volumetric flow, as is necessary for the pressurization of the brake cylinders.

If the respective loading of the rail vehicle is to be taken into account in the braking, then, in the inventive brake arrangement, there is advantageously provided a second pressure sensor, which is subjected to the load pressure of the rail vehicle and delivers a corresponding control current to the brake control, so that this then generates at the output of the electropneumatic regulator a pressure dependent on the load pressure, which pressure is relayed via the shuttle valve to the input of the relay valve and is there converted into a corresponding brake pressure for the brake cylinders.

Where appropriate, it is also advantageous, however, if the control valve device is a load brake relay valve. In this case, the load pressure is taken into account by the load brake relay valve itself and an appropriate brake pressure for the brake cylinders generated.

The brake arrangement according to the invention is also distinguished by the fact that, when the emergency brake device is activated, the brake cylinder pressure can be increased, but not reduced, by the electrical brake device.

In addition, in the event of a differential pressure in the main air line greater than 1.5 bar, and the thereby generated pilot pressure of the control valve can advantageously be increased, but not reduced, by the electrical brake device.

For further illustration of the invention,

BRIEF DESCRIPTION OF THE SEVERAL VIEWS OF THE DRAWING

FIG. 3 shows an illustrative embodiment of the inventive brake arrangement as an indirect brake arrangement having two shuttle valves and a load brake relay valve.

DESCRIPTION OF THE INVENTION

Figure 1:
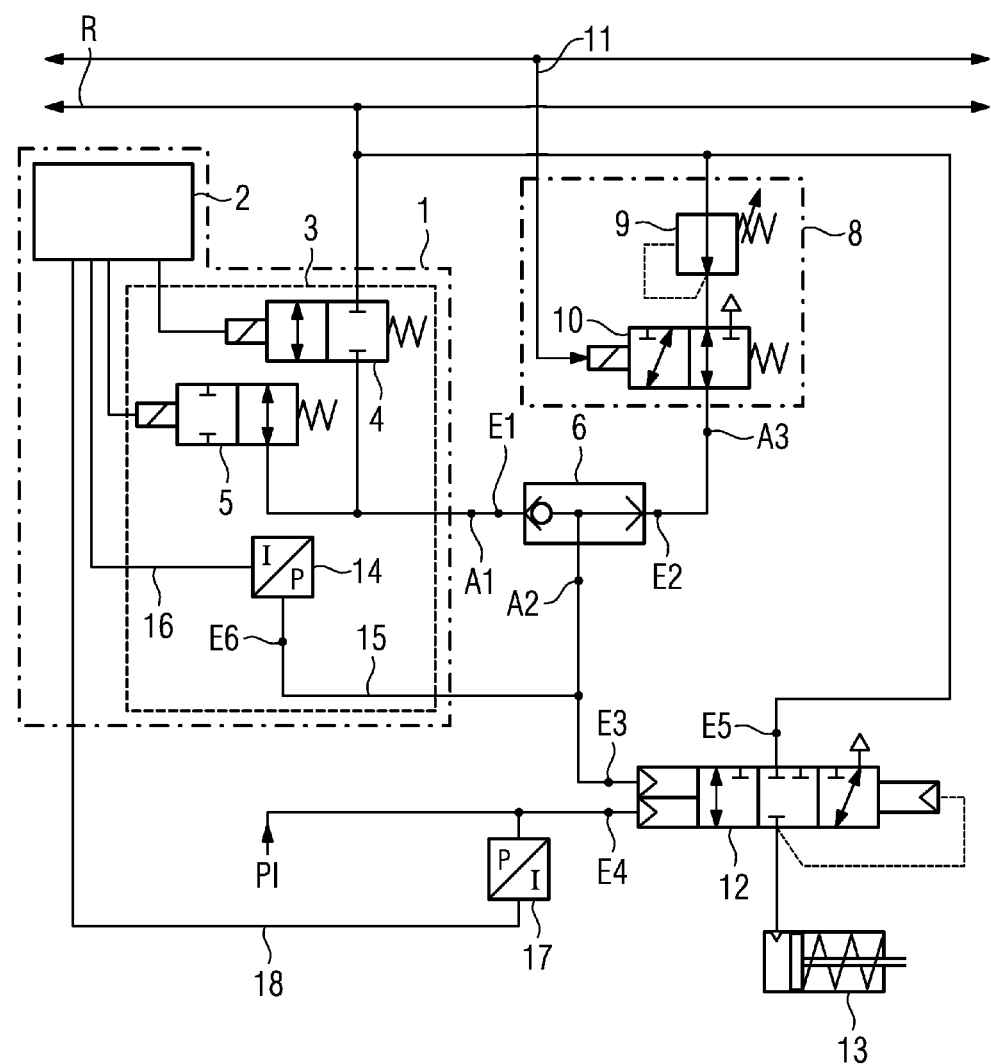
FIG. 1 shows an illustrative embodiment of the inventive brake arrangement as a direct brake arrangement having a shuttle valve and a load brake relay valve.

The illustrative embodiment according to FIG. 1 shows a brake arrangement of a rail vehicle (not represented), comprising an electrical brake device 1 containing an electronic brake control 2. Connected up to the brake control 2 is an electropneumatic regulator 3. The electropneumatic regulator 3 has a vent valve 4 and a stop valve 5. Connected up to an output A1 of the electropneumatic regulator 3 is an input E1 of a shuttle valve device 6, which in the represented illustrative embodiment is formed by a double check valve.

A further input E2 of the shuttle valve device 6 is connected by a connecting line to a pneumatic output A3 of an emergency brake device 8. The emergency brake device 8 has a pressure reducer 9, with which an electromagnetic emergency brake valve 10 is arranged in series. This emergency brake valve 10 operates according to the closed-circuit principle, i.e. it is normally constantly loaded with current and hereby keeps the emergency brake valve closed. The emergency brake valve 10 can be actuated via an emergency brake loop current circuit 11.

An output A2 of the shuttle valve device 6 is connected to a control valve device in the form of a load brake relay valve 12, to be precise to one input E3 thereof; a further input E4 is pressurized with a load pressure P1, so that, in a known manner, a brake cylinder 13 arranged downstream of the load brake relay valve 12 can be subjected to a load-dependent brake pressure. Via a further input E5, the load brake relay valve 12 is connected in a customary manner through a line R to the so-called R-container, i.e. the compressed air reservoir, which may be shut off from the main container air line with a check valve.

As is also shown by FIG. 1, a pressure sensor 14 of the electropneumatic regulator 3 is connected with its pressure input E6 to the output A2 of the shuttle valve device 6 or the input E3 of the load brake relay valve 12. Via a pressure line 15, the pressure sensor 14 is thus subjected to a pilot pressure Cv. A corresponding current is fed from the pressure sensor 14 via a line 16 to the brake control 2.

In addition, it should also be pointed out that, for monitoring and load registration purposes, a further pressure sensor 17 is connected up with its pressure input to the input E4 of the load brake relay valve 12 and is connected with its output, via a line 18, to the brake control 2.

The brake device represented in FIG. 1 operates as follows:

In a standard service braking, the emergency brake valve 10 is energized, and hence activated, via the emergency brake loop current circuit 11. This means that the emergency brake valve is shut off and thus a pressure of 0 bar is present at the input E2 of the shuttle valve device 6. If a brake set value signal is generated by the train driver, similarly as in the prior art by a master controller (not represented), which signal is evaluated by the vehicle control system, then, via a vehicle bus (not represented), an appropriate set value for the electropneumatic regulator 3 is transmitted to the brake control 2. This hereupon controls the pilot pressure Cv at the input E3 of the load brake relay valve 12 with the aid of the stop valve 5 and the vent valve 4. The pressure in the brake cylinder 13 can here be increased by the energization of the stop valve 5 and vent valve 4 and maintained by the energization of the stop valve 5; the pilot pressure Cv is reduced by the de-energization of both valves 4 and 5. By means of the pressure sensor 14, the pilot pressure Cv is registered and regulated. The load brake relay valve 12 then converts the pilot pressure Cv, with allowance for the load pressure P1, into the pressure in the brake cylinder 13. Should the brake be released, the stop valve and the vent valve 4 and 5 are no longer energized and the brake cylinder 13 thus becomes pressureless.

In the case of an emergency braking, the emergency brake loop current circuit 11 becomes dead, whereby the emergency brake valve 10 drops out, and the emergency brake pressure set by the pressure reducer 9 is let through; at the input E2 it acts upon the shuttle valve device 6, whereupon this relays the emergency brake pressure to the load brake relay valve 12.

In addition, the emergency brake pressure, by way of a back-up, is set by the brake control 2 and the electropneumatic regulator 3 by means of the pressure sensor 14. Any occurring failure of the emergency brake valve 10, i.e. lingering in the activation setting, can thereby be compensated. Moreover, the possibility exists of deliberately performing with the aid of the electropneumatic regulator 3 an overload, i.e. of delivering to the brake cylinder 13 a brake pressure higher than the emergency brake pressure in the event of an emergency braking.

Figure 2:
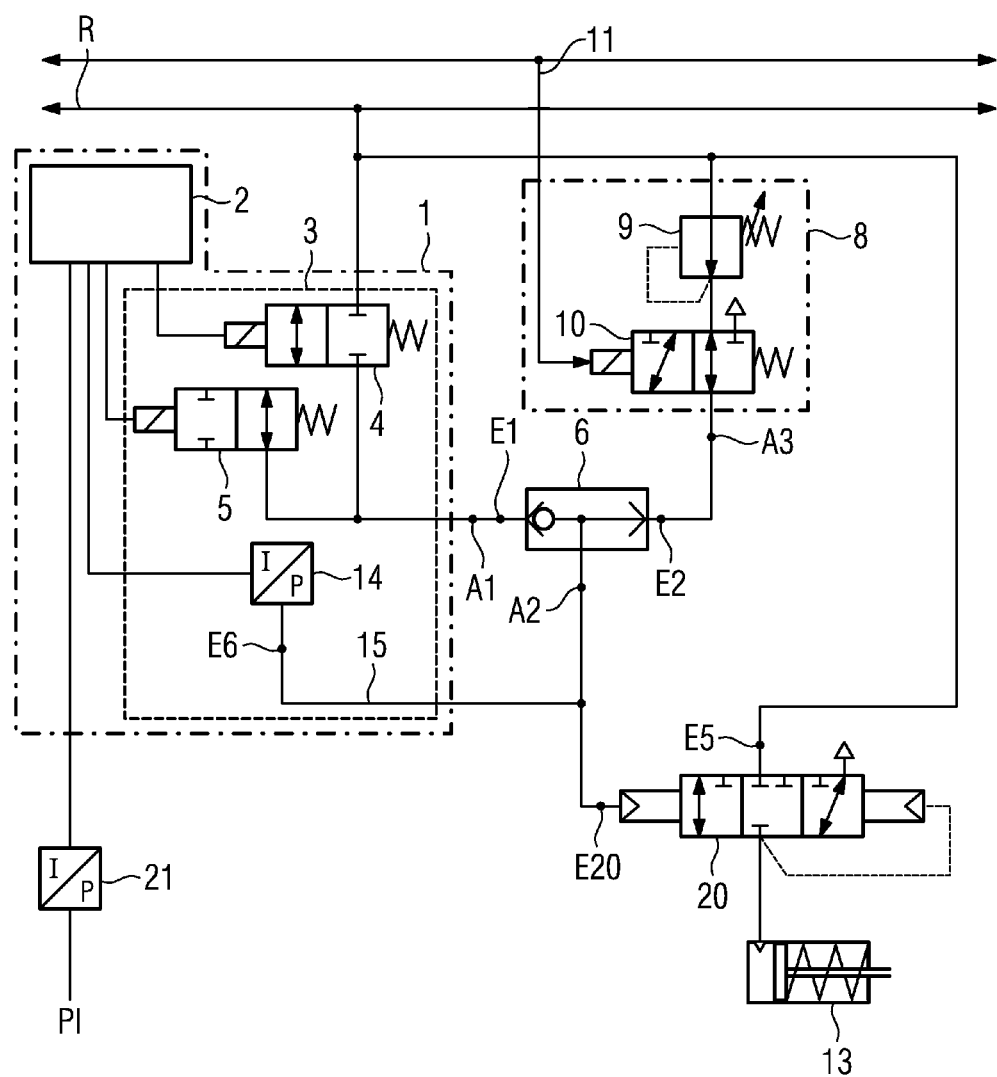
FIG. 2 shows a further illustrative embodiment of the inventive brake arrangement likewise in the form of a direct brake arrangement having a shuttle valve and a relay valve.

In the illustrative embodiment according to FIG. 2, a direct brake arrangement is likewise at issue. In FIG. 2, elements corresponding to those according to FIG. 1 are provided with the same reference symbols.

Contrary to the illustrative embodiment according to FIG. 1, in the brake arrangement according to FIG. 2, a relay valve 20, instead of a load brake relay valve, is used for the control valve device, which relay valve 20 is connected with its input E20 to the output A2 of the shuttle valve device 6. Downstream of the relay valve 20 is arranged, in turn, the brake cylinder 13. An input E21 of the relay valve 20 is also wired up in the same way as already described above in connection with the description of FIG. 1. The relay valve 20 converts the small volumetric flow flowing to it from the shuttle valve device 6 into a large volumetric flow, without, however, making an adaptation to the load pressure. In this illustrative embodiment, account is taken of higher load pressure in that the respective load pressure is registered by means of an additional pressure sensor 21 and a corresponding current is fed to the brake control 2. By means of the electropneumatic regulator 3, a pressure corresponding to the load pressure is delivered to the shuttle valve device 6, so that the relay valve 20 then acquires a pressure adapted to the respective weight of the rail vehicle. Consequently, a possibly higher brake pressure is then delivered by the relay valve 20 to the brake cylinder 13. The emergency brake pressure is here set by the pressure reducer 9 such that, when the rail vehicle is empty, for instance, the brake pressure required for the preset deceleration is generated.

In an emergency braking situation, in the event of failure of the electropneumatic regulator 3 or another brake control of the rail vehicle, the illustrative embodiment according to FIG. 2 also enables this failure to be compensated, by increasing the brake pressure in another brake control path.

The brake arrangement according to FIG. 2 operates in a similar manner to that according to FIG. 1. If a brake set value is generated by the train driver, then a set value for the electropneumatic regulator 3 is transmitted to the brake control 2 via, for instance, the vehicle bus (not represented). The brake control 2 registers the load pressure by virtue of the additional pressure sensor 21 and subsequently calculates the pressure in the pressure cylinder 13 which is required for the set value. After this, the brake control 2 controls the pilot pressure Cv with the aid of the stop valve and vent valve 4 and 5. This pressure is registered and regulated by means of the pressure sensor 14. The relay valve 20 then converts the pilot pressure Cv into the brake pressure for the brake cylinder 13. Only an adaptation of the volumetric flow is carried out. Should the brake be released, the stop valve and the vent valve 4 and 5 are no longer energized and the brake cylinder 13 thus becomes pressureless.

In the case of an emergency braking also, the brake arrangement according to FIG. 2 operates similarly to that according to FIG. 1, yet with the difference that, in the event of failure of the emergency brake valve 10, the emergency brake pressure is adjusted by the brake control 2 and the electropneumatic regulator 3. In this case, however, the load pressure is registered by the brake control 2 and the emergency brake pressure which is actually required is computed. In the case of a loading of the rail vehicle, with the aid of that pressure of the electropneumatic regulator 3 which has been superimposed by the shuttle valve device 6 the emergency brake pressure is increased to the brake pressure necessary for the deceleration, whereby a load adjustment of the brake pressure is enabled.

Figure 3:
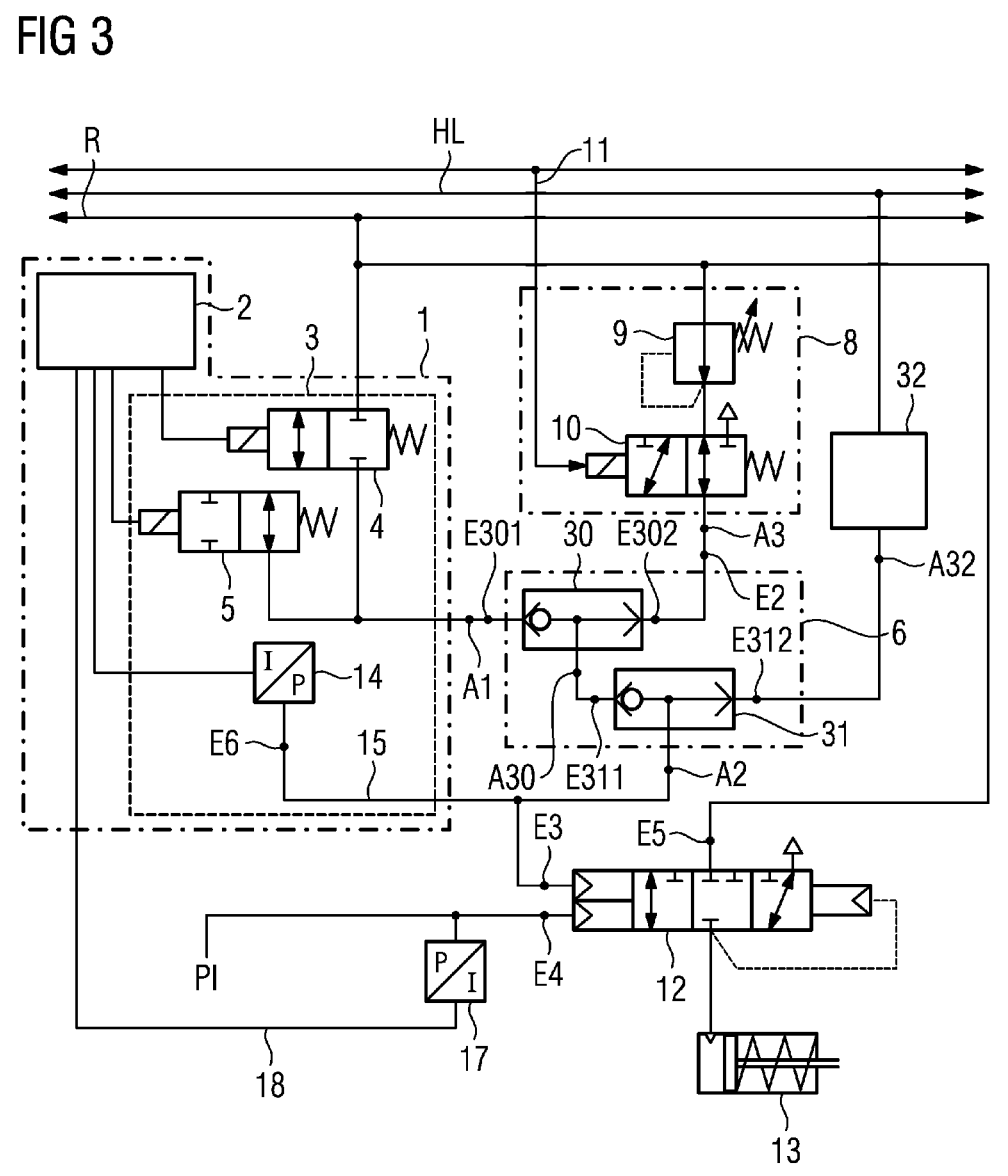

FIG. 3 shows a brake arrangement according to the invention which acts both as a direct and as an indirect brake. Here too, parts corresponding to those according to FIGS. 1 and 2 are provided with the same reference symbols. A fundamental difference between the embodiment according to FIG. 3 and that according to FIG. 1 consists in the fact that the shuttle valve device 6 here consists of a first shuttle valve 30 and a second shuttle valve 31. The first shuttle valve 30 is connected with its input E301 to the output A1 of the electropneumatic regulator 3 and with its second input E302 to the output A3 of the emergency brake device 8. The output A30 of the first shuttle valve 30 is connected to one input E311 of the further shuttle valve 31, which with its other input E312 is connected up to the output A32 of a control valve 32 which is constituted by a valve as is defined, for instance, in UIC leaflets UC541-01, and thus possesses a so-called A-chamber, which stores the maximum pressure in the main air line HL as a reference pressure; the output of the second shuttle valve 31 forms the output of the shuttle valve device 6. Connected up to the output A2 of the shuttle valve device 6 are—as already described in connection with FIG. 1—the pressure sensor 14 and the load brake relay valve 12. In a further embodiment, the pressure sensor 14 can also be connected up to the output A1 of the electropneumatic regulator or to the output A30 of the shuttle valve 30.

In the indirectly operating brake arrangement represented in FIG. 3, the brake set value, in addition to the electric signals, is distributed in the rail vehicle via the main air line HL. This is described in the pressureless state, i.e. in order to release a brake, in the main air line HL the pressure must normally measure 5 bar. For braking, this pressure is then lowered and, in the event of a pressure differential of 1.5 bar, the maximum pressure must be reached in the brake cylinder 13. In order to convert the signal into a brake pressure, the control valve 32 which has already been described above is used, which control valve stores in its A-chamber the maximum pressure in the main air line HL as a reference value. If a pressure differential is recognized by the control valve 32 due to a braking operation, a control pressure is generated at the output A32 of the control valve 32. If the pressure differential measures more than 1.5 bar, then 3.8 bar are generated as the control pressure, which, by means of the second shuttle valve 31, is superimposed on the pressure generated by the electropneumatic regulator 3 and pilots the load brake relay valve 12. This converts the control pressure, in dependence on the load pressure registered by the further pressure sensor 17, into a brake pressure in the brake cylinder 13.

In addition, an overloading can here be achieved by generation of an increased pressure with the aid of the electropneumatic regulator 3.

Figure 4:
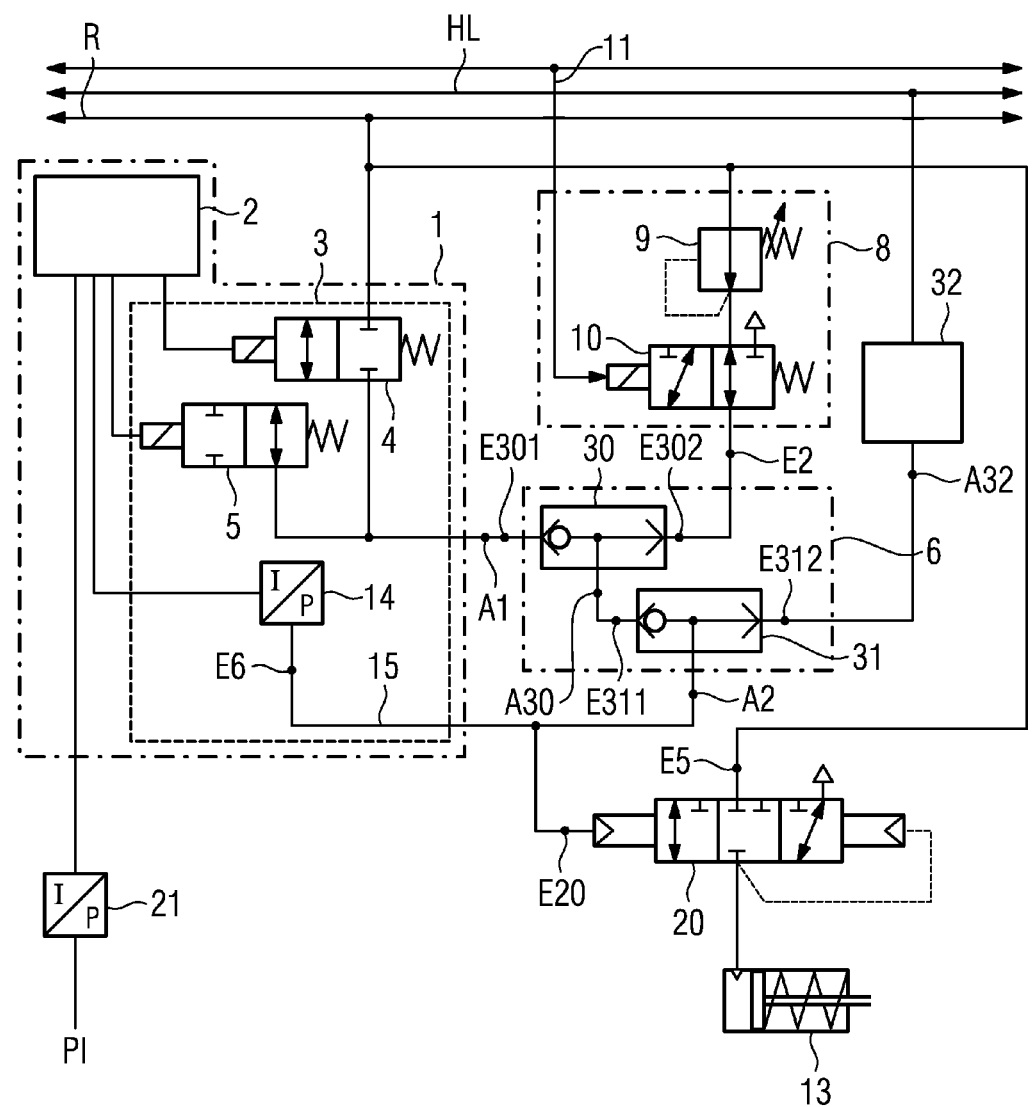
FIG. 4 shows a further illustrative embodiment as an indirect brake arrangement having two shuttle valves and a relay valve.

For the illustrative embodiment according to FIG. 4, extensive explanations are no longer necessary with regard to the statements relating to FIGS. 1 to 3, in particular with regard to the description of FIG. 3, because the indirect brake arrangement represented in FIG. 4 differs from that according to FIG. 3 essentially only inasmuch as, instead of a load brake relay valve as the control valve device, a relay valve similar to the relay valve 20 according to FIG. 2 is used. In this illustrative embodiment, the load pressure is registered with an additional pressure sensor 21 in accordance with FIG. 2.

The invention claimed is:

1. A brake arrangement of a rail vehicle, comprising:
an electrical brake device having an electronic brake control and having an electro-pneumatic regulator including a pressure sensor, said electrical brake device further having a pneumatic output;
an emergency brake device having a pressure reducer in series with a valve device, said emergency brake device further having a pneumatic output;
a shuttle valve device having inputs connected to said pneumatic output of said electrical brake device and to said pneumatic output of said emergency brake device, and having an output connected to a control valve device disposed upstream of a brake cylinder;
wherein said valve device is an electromagnetic emergency brake valve operating according to a closed-circuit principle; and
wherein said pressure sensor of said electro-pneumatic regulator is connected to said output of said shuttle valve device.

2. The brake arrangement according to claim 1, wherein:
said shuttle valve device comprises a first shuttle valve having inputs and an output and a second shuttle valve having first and second inputs and an output;
said inputs of said first shuttle valve form the inputs of said shuttle valve device and said output of said first shuttle valve is connected to said first input of said second shuttle valve;
said second input of said second shuttle valve is connected to an output of a control valve connected to a main air line of the brake arrangement and said output of said second shuttle valve forms the output of said shuttle valve device.

3. The brake arrangement according to claim 1, wherein said shuttle valves are double check valves.

4. The brake arrangement according to claim 1, wherein said control valve device is a relay valve.

5. The brake arrangement according to claim 1, wherein said control valve device is a load brake relay valve.

6. The brake arrangement according to claim 1, wherein, when said emergency brake device is activated, a brake cylinder pressure can only be increased by said electrical brake device.

7. The brake arrangement according to claim 1, wherein, on occasion of a differential pressure in a main air line greater than 1.5 bar, a pilot pressure of a control valve thereby generated can only be increased by the electrical brake device.

* * * * *